United States Patent Office 3,438,989
Patented Apr. 15, 1969

3,438,989
PROCESS FOR THE PRODUCTION OF (±) DIHYDROTHEBAINONE
John Shavel, Jr., Menham, and Glenn C. Morrison, Dover, N.J., assignors to Warner Lambert Pharmaceutical Company, Morris Plains, N.J., a corporation of Delaware
No Drawing. Filed Mar. 10, 1967, Ser. No. 622,108
Int. Cl. C07d 43/32
U.S. Cl. 260—285       2 Claims

ABSTRACT OF THE DISCLOSURE

A new method for the preparation of (±) dihydrothebainone, an intermediate for the synthesis of morphine, is claimed. This method comprises subjecting 1,2,3,4-tetrahydro-6-methoxy-2-methyl-1-veratrylisoquinoline to Birch reduction, first to remove the methyl group from the 3-oxygen of the veratryl group and second to reduce the isoquinoline moiety. Treatment of the resulting intermediate with dilute acid afforded (±) dihydrothebainone and 2-hydroxy-3-methoxy-M-methylmorphin-6-one. This method was also carried out in the N-des lower alkyl series.

This invention relates to a new process for the production of (±) dihydrothebainone an intermediate in the total synthesis of morphine, which is a well-known drug useful as a narcotic analgesic.

Dihydrothebainone may be converted to morphine according to the processes described by Gates et al. JACS 74 1109(1952), and Elad & Ginsburg J.C.S., 1954, 3052.

The process of this invention is carried out by reacting 3,4-dimethoxyphenylacetic acid and with m-methoxyphenethylamine at an elevated temperature such as 150–200° C. to give an amide of the formula:

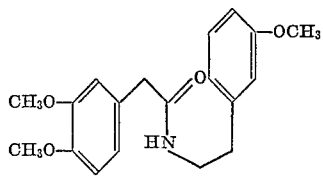

(1)

On cyclodehydration of the amide (1) using a catalyst such as phosphorous oxychloride there is formed a dehydro intermedite which on reduction with an alkali metal borohydride such as sodium borohydride affords a tetrahydroisoquinoline of the formula:

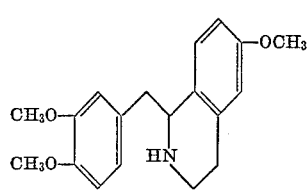

(2)

Compound (2) may be converted to the corresponding N-lower alkyl derivative (3) by treatment with a lower alkyl ester such as ethyl formate and subsequent reduction with lithium aluminum hydride. Compound 3 has the following formula:

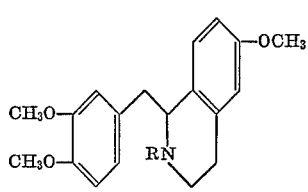

(3)

wherein R is lower alkyl. Compounds (2) and (3) can be converted to the corresponding monohydroxy compounds 4 and 5, respectively, by treatment with an alkali metal such as sodium and an aliphatic alcohol such as t-butanol in liquid ammonia.

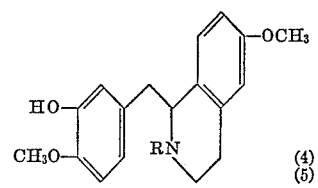

(4) R=H
(5) R=lower alkyl

Further treatment of compounds 4 or 5 with the same reagents, while maintaining a higher alkali metal concentration, brings about reduction to the hexahydroisoquinoline 6 and 7.

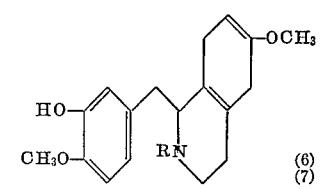

(6) R=H
(7) R=lower alkyl

Treatment of the enol ether 6 with a mineral acid such as 1N hydrochloric acid at a temperature of about 80 to 95° C. for about 10 to 20 minutes leads to the ketone 8.

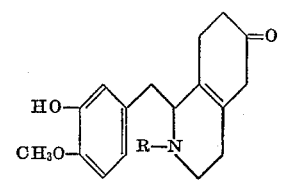

(8)

Heating with acid over a period of about 1 to 3 hours results in the conjugated ketone 9.

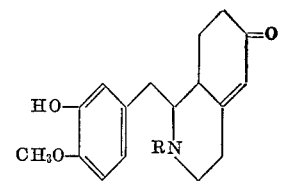

(9)

The final result of exposure of 6 and 7 to acid in concentrated acid, for example 10 to 40% hydrochloric acid, for about 20 hours is the two cyclized ketones 10 and 12.

Prolonged acid treatment of the enol ether 7 leads to (±) dihydrothebainone (11) and 2-hydroxy-3-methoxy-N-methylmorphin-6-one (13).

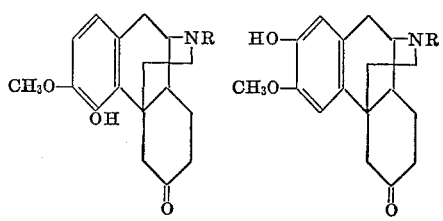

(10) R=H
(11) R=lower alkyl

(12) R=H
(13) R=lower alkyl

The following examples are included in order further to illustrate the invention.

EXAMPLE 1

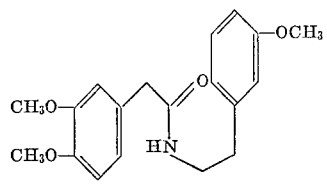

N - (m - methoxyphenethyl) - 3,4 - dimethoxyphenylacetamide.—A mixture of 19.6 g. of 3,4-dimethoxyphenylacetic acid and 15.8 g. of m-methoxyphenethylamine was heated at 175° for 20 hr. under a stream of nitrogen. The reaction mixture was dissolved in 130 ml. of benzene and 65 ml. of petroleum ether (B.P. 30-60°) added. On standing there was deposited 28 g. (85%) of a crystalline solid, M.P. 94–95°. Recrystallization from benzene gave an analytical sample, M.P. 95–96°.

Analysis.—Calcd. for $C_{19}H_{23}NO_3$: C, 69.28; H, 7.04; N, 4.25. Found: C, 69.35; H, 7.21; N, 4.24.

EXAMPLE 2

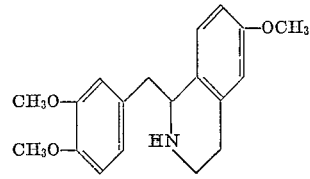

1,2,3,4 - tetrahydro - 6 - methoxy - 1 - veratrylisoquinoline.—A solution of 82.2 g. of N (m-methoxyphenethyl)-3,4-dimethoxyphenylacetamide and 82 ml. of phosphorus oxychloride in 800 ml. of benzene was refluxed for 90 min. On pouring the reaction mixture into 1 l. of ether there was deposited 123 g. of a solid. The solid was dissolved in 1.5 l. of warm water (60°), the pH adjusted to approximately 3 with 10% sodium hydroxide solution, and 15 g. of sodium borohydride added over a 20 min. interval. After the addition had been completed stirring was continued for an additional 20 min. The pH of the solution was adjusted to below 2 with 20% hydrochloric acid, after which it was made basic with 10% sodium hydroxide solution and extracted with ether. The ether layer was washed with water, dried over sodium sulfate, and the solvent removed. The residue (75 g.) after recrystallization from benzene-petroleum ether (B.P. 30–60°) gave 60 g. (78%), M.P. 89.5–91°. Further recrystallization from petroleum ether gave an analytical sample, M.P. 92–93°.

Analysis.—Calcd. for $C_{19}H_{23}NO_3$: C, 72.82; H, 7.40; N, 4.47. Found: C, 72.99; H, 7.52; N, 4.23.

EXAMPLE 3

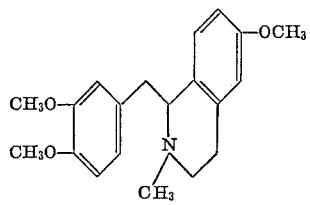

1,2,3,4 - tetrahydro - 6 - methoxy - 2 - methyl - 1 - veratrylisoquinoline.—A solution of 18.0 g. of 1,2,3,4,-tetrahydro-6-methoxy-1-veratrylisoquinoline in 250 ml. of ethylformate was refluxed for 20 hr. and then the excess formate distilled off. A solution of the residue in 550 ml. of tetrahydrofuran was added dropwise to a slurry of 10 g. of lithium aluminum hydride in 200 ml. of tetrahydrofuran. The mixture was stirred at room temperature for 4 hr. and then the excess hydride destroyed by the dropwise addition of water and 40% sodium hydroxide solution. The tetrahydrofuran layer was decanted, dried over sodium sulfate, and the solvent removed. The residue, after recrystallization from petroleum ether (B.P. 30–60°), gave 15.5 g. (74%) of a crystalline solid, M.P. 69–71°. Further recrystallization gave an analytical sample, M.P. 71–72°.

Analysis.—Calcd. for $C_{20}H_{25}NO_3$: C, 73.36; H, 7.70; N, 4.28. Found: C, 73.34; H, 7.72; N, 4.55.

EXAMPLE 4

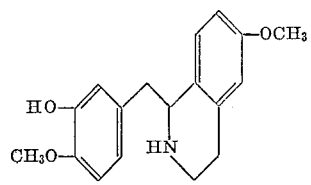

1,2,3,4 - tetrahydro - 1 - (3 - hydroxy - 4 - methoxybenzyl)-6-methoxyisoquinoline.—To a solution of 10.9 g. of 1,2,3,4-tetrahydro-6-methoxy-1-veratrylisoquinoline in 500 ml. of tetrahydrofuran was added 600 ml. of ammonia. Over a 3 hour interval 8.3 g. of sodium and 27 ml. of t-butanol was added in ten equal portions. The ammonia was allowed to evaporate, one l. of water was added, and the pH was adjusted to 8. On standing, there was deposited 7.3 g. (70%) of crystalline solid, M.P. 197–198°. Recrystallization from chloroform gave an analytical sample, M.P. 196–197°.

Analysis.—Calcd. for $C_{18}H_{21}NO_3$: C, 72.21; H, 7.07; N, 4.68. Found: C, 72.34; H, 7.31; N, 47.1.

EXAMPLE 5

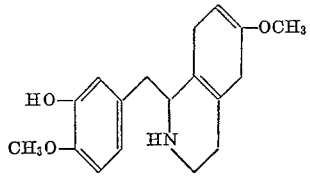

1,2,3,4,5,8 - hexahydro -1 - (3 - hydroxy - 4 - methoxybenzyl)-6-methoxy-isoquinoline.—To a solution of 9.4 g. of 1,2,3,4 tetrahydro - 1 - (3 - hydroxy - 4 - methoxybenzyl)-6-methoxyisoquinoline in 500 ml. of tetrahydrofuran was added 350 ml. of ammonia. Then 1.0 g. of sodium was added and stirring continued for 0.5 hr. Over the next 2 hour interval 4.6 g. of sodium and 14 ml. of t-butanol were added alternately in ten equal portions. The remaining sodium was destroyed with isopropanol. The ammonia was allowed to evaporate, 1.3 l. of water was added, the pH adjusted to 8.5 with acetic acid, and the solution was extracted with methylene chloride. On concentration of the methylene chloride solution there was deposited 8.0 g. (84%) of a crystalline solid, M.P. 180–181°. Recrystallization from chloroform gave an analytical sample, M.P. 177–178.5°.

Analysis.—Calcd. for $C_{18}H_{23}NO_3$: C, 71.73; H, 7.69; N, 4.65. Found: C, 71.56; H, 7.74; N, 4.58.

EXAMPLE 6

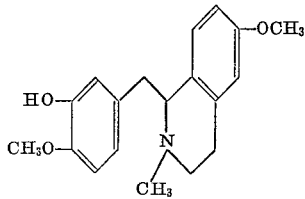

1,2,3,4-tetrahydro - 1 - (3-hydroxy-4-methoxybenzyl)-6-methoxy-2-methylisoquinoline.—To a solution of 12.0 g. of 1,2,3,4-tetrahydro-6-methoxy-6-methyl - 1 - veratrylisoquinoline in 500 ml. of tetrahydrofuran was added 700 ml. of ammonia. Over a 6 hour interval 8.5 g. of sodium and 28 ml. of t-butanol were added in ten equal portions. The ammonia was allowed to evaporate, 1.5 l. of water was added, the pH was adjusted to 8 with acetic acid, and the solution was extracted with methylene chloride. The methylene chloride layer was washed with water, dried over sodium sulfate, and the solvent was removed. The residue, after recrystallization from isopropyl ether, afforded 6.8 g. (59%) of a solid, M.P. 105–106°. Further recrystallization gave an analytical sample, M.P. 109.5–110°.

Analysis.—Calcd. for $C_{19}H_{23}NO_3$: C, 72.82; H, 7.40; N, 4.47. Found: C, 73.22; H, 7.46; N, 4.70.

EXAMPLE 7

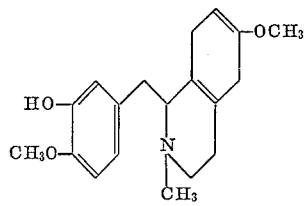

1,2,3,4,5,8 - hexahydro-1-(3-hydroxy-4-methoxybenzyl)-6-methoxy-2-methylisoquinoline.—To a solution of 6.0 g. of 1,2,3,4 - tetrahydro-1-(3-hydroxy-4-methoxybenzyl)-6-methoxy-2-methylisoquinoline in 350 ml. of tetrahydrofuran was added 300 ml. of ammonia. Then 1.0 g. of sodium was added and stirring was continued for 0.5 hours. Over the next 3 hour interval 4.35 g. of sodium and 33 ml. of t-butanol were added in ten equal portions. The excess sodium was destroyed with ammonium chloride. The ammonia was allowed to evaporate, 1.5 l. of water added, the pH was adjusted to 8.5 with acetic acid, and the solution was extracted with ether. The ether solution was washed with water, dried over sodium sulfate and the solvent was removed. Crystallization of the residue from isopropyl ether—Skelly solve B afforded 4.1 g. (68%) of a solid, M.P. 115.5–116.5°. Recrystallization from isopropyl ether gave an analytical sample, M.P. 116.5–117.5°.

Analysis.—Calcd. for $C_{19}H_{25}NO_3$: C, 72.35; H, 7.99; N, 4.44. Found: C, 72.63; H, 8.18; N, 4.38.

EXAMPLE 8

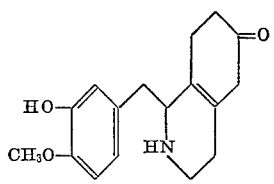

1,2,3,4,7,8 - hexahydro-1-(3-hydroxy-4-methoxybenzyl)-6(5H)-isoquinoline.—A solution of 0.500 g. of 1,2,3,4,5,8 - hexahydro-1-(3-hydroxy-4-methoxybenzyl)-6-methoxyisoquinoline in 3 ml. of 1 N hydrochloric acid was heated on the steam bath for 15 min. The reaction mixture was neutralized with saturated sodium bicarbonate solution and extracted with chloroform. Removal of the solvent afforded, after recrystallization from benzene, 0.095 g. (18%) of a solid, M.P. 131–133°. Further recrystallization gave an analytical sample, M.P. 135.5–136.5°.

Analysis.—Calcd. for $C_{17}H_{21}NO_3$: C, 71.05; H, 7.37; N, 4.87. Found: C, 71.13; H, 7.39; N, 5.16.

EXAMPLE 9

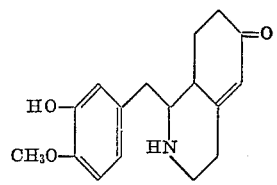

1,2,3,4,8,8a-hexahydro - 1 - (3-hydroxy-4-methoxybenzyl)-6(7H)-isoquinoline.—A solution of 0.50 g. of 1,2,3,4,5,8-hexahydro-1-(3 - hydroxy-4-methoxybenzyl)-6-methoxyisoquinoline in 6 ml. of 1 N hydrochloric acid was heated on the steam bath for 1 hr. The reaction mixture was neutralized with saturated sodium bicarbonate solution and extracted with chloroform. Removal of the solvent afforded, after recrystallization from ethyl acetate, 0.20 g. (36%) of a solid, M.P. 186–188°. Recrystallization from acetonitrile gave an analytical sample, M.P. 191.5–192°.

Analysis.—Calcd. for $C_{17}H_{21}NO_3$: C, 71.05; H, 7.37; N, 4.87. Found: C, 71.20; H, 7.60; N, 4.76.

EXAMPLE 10

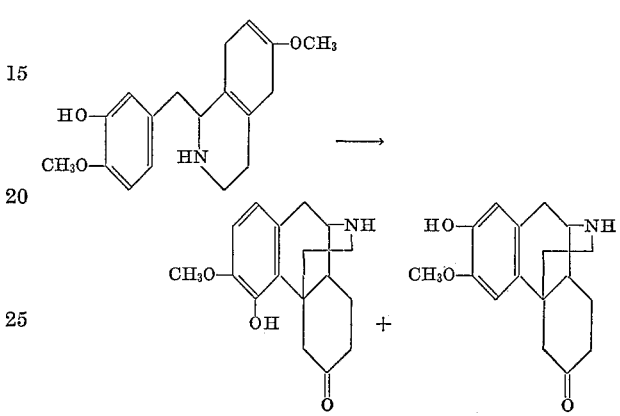

Cyclization of 1,2,3,4,5,8-hexahydro-1-(3-hydroxy-4-methoxybenzyl)-6-methoxyisoquinoline.—A solution of 8.0 g. of 1,2,3,4,5,8-hexahydro-1-(3-hydroxy-4-methoxybenzyl)-6-methoxyisoquinoline in 100 ml. of hydrochloric acid was refluxed for 20 hours. The pH of the reaction mixture was adjusted to 8.5 with ammonium hydroxide, and the solution was extracted with chloroform. The chloroform layer was washed with 25% sodium hydroxide solution, and water, dried over sodium sulfate, and the solvent was removed. The residue was dissolved in benzene and Skellysolve B was added. A solid was deposited, which after recrystallization from acetone-Skellysolve B, afforded 40 mg. (1%) of (±) des-N-methyldihydrothebainone, M.P. 164–164.5°.

Analysis.—Calcd. for $C_{17}H_{21}NO_3$: C, 71.05; H, 7.37; N, 4.87. Found: C, 70.95; H, 7.36; N, 5.01.

The sodium hydroxide layer was neutralized to pH 8 with acetic acid, and extracted with chloroform. The chloroform solution was dried over sodium sulfate and the solvent was removed. Crystallization of the residue from isopropanol afforded 114 mg. (2%) of 2-hydroxy-3-methoxymorphin-6-one, M.P. 225–228°. Further recrystallization gave an analytical sample, M.P. 230.5–231.5°.

Analysis.—Calcd. for $C_{17}H_{21}NO_3$: C, 71.05; H, 7.37; N, 4.87. Found: C, 71.13; H, 7.48; N, 4.68.

EXAMPLE 11

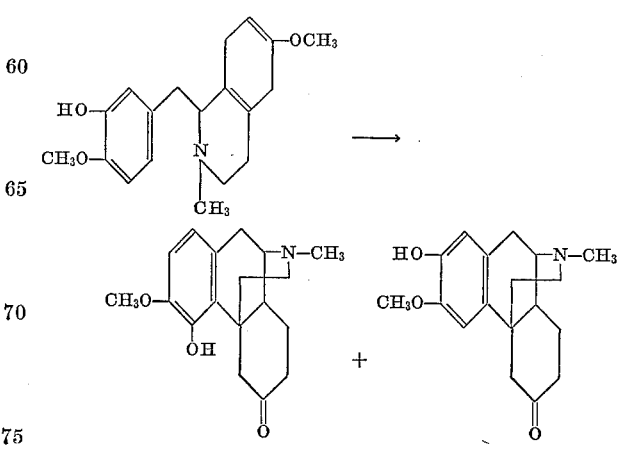

Cyclization of 1,2,3,4,5,8-hexahydro-1-(3-hydroxy-4-methoxybenzyl) - 6 - methoxy-2-methylisoquinoline.—A solution of 6.3 g. of 1,2,3,4,5,8-hexahydro-1-(3-hydroxy-4-methoxybenzyl)-6-methoxy-2 - methylisoquinoline in 250 ml. of 10% hydrochloric acid for 20 hours. The pH of the reaction mixture was adjusted to 8.5 with 40% sodium hydroxide solution and the solution was extracted with methylene chloride. The methylene chloride layer was washed with water, dried over sodium sulfate, and the solvent was removed. Crystallization of the residue from isopropyl ether afforded 2.2 g. (37%) of 2-hydroxy-3-methoxy-N-methylmorphine-6-one, M.P. 194–197.5°. Recrystallization from isopropanol gave an analytical sample M.P. 200–201°.

Analysis.—Calcd. for $C_{18}H_{23}NO_3$: C, 71.73; H, 7.69; N, 4.65. Found: C, 71.43; H, 7.73; N, 4.76.

The filtrate from the crystallization was concentrated to dryness and the residue was chromatographed on 80 g. of alumina. Elution with 1% methanol in ether gave, after recrystallization from isopropyl ether 0.19 g. (3%) of (±) dihydrothebainone, M.P. 177.5–178°.

Analysis.—Calcd. for $C_{18}H_{23}NO_3$: C, 71.73; H, 7.69; N, 4.65. Found: C, 71.74; H, 7.75; N, 4.81.

It is understood that the foregoing detailed description is given merely by way of illustration and that many variations may be made therein without departing from the spirit of our invention.

Having described our invention, what we desire to secure by Letters Patent is:

1. A process which comprises:
   (a) Contacting a compound of the formula:

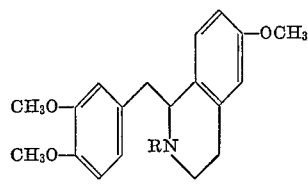

(1)

wherein R is hydrogen or lower alkyl with an alkali metal and an aliphatic alcohol in liquid ammonia to obtain a compound of the formula:

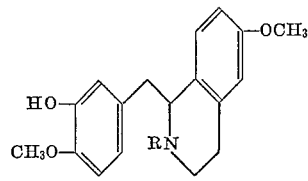

(2)

(b) Contacting compound 2 in a higher concentration of the alkali metal and an aliphatic alcohol in liquid ammonia to obtain a compound of the formula:

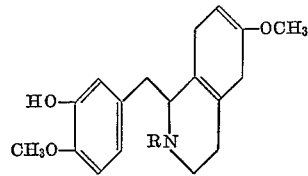

(3)

(c) Contacting compound 3 with a mineral acid at a temperature of about 80 to 95° for 10 to 15 minutes to yield a ketone of the formula:

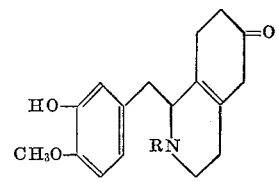

(4)

(d) Contacting compound 4 with a mineral acid at a temperature of about 80 to 95° for about 60 minutes to yield a compound of the formula:

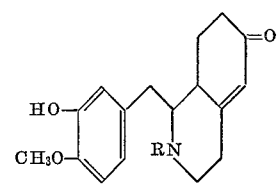

(5)

(e) Contacting said compound 5 with a strong non-oxidizing mineral acid for at least 20 hours to yield dihydrothebainone.

2. A method for the production of dihydrothebainone and 2-hydroxy-3-methoxy-N-methyl-morphin-6-one which comprises heating a compound of the formula:

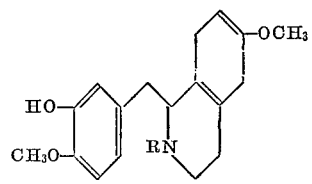

(7)

wherein R is hydrogen or lower alkyl at a temperature of about 80 to 90° C. for at least 20 hours in the presence of a strong non-oxidizing mineral acid.

References Cited

UNITED STATES PATENTS

| | | | |
|---|---|---|---|
| 2,797,221 | 6/1957 | Gates | 260—285 |
| 3,314,964 | 4/1968 | Shavel et al. | 260—288 |
| 3,395,152 | 7/1968 | Shavel et al. | 260—288 |

ALEX MAZEL, Primary Examiner.

D. G. DANS, Assistant Examiner.

U.S. Cl. X.R.

260—289, 521, 559, 570.8